United States Patent [19]
Boyer et al.

[11] 3,710,904
[45] Jan. 16, 1973

[54] BRAKE AND TRANSMISSION SHIFT LOCKS WITH SINGLE CONTROL LEVER

[75] Inventors: Ronald G. Boyer, Peoria; Drexel R. Fouts, Bellevue, both of Ill.

[73] Assignee: Caterpillar Tractor Co., Peoria, Ill.

[22] Filed: Dec. 16, 1971

[21] Appl. No.: 208,751

[52] U.S. Cl. ............... 192/4 A, 188/265, 74/529
[51] Int. Cl. ................................. B60k 29/02
[58] Field of Search ............... 192/4 A, 4 B, 4 C

[56] References Cited

UNITED STATES PATENTS

| | | | |
|---|---|---|---|
| 3,110,363 | 11/1963 | Chapman et al. | 192/4 A X |
| 3,116,815 | 1/1964 | Chapman | 192/4 A X |
| 3,255,852 | 6/1966 | Martin et al. | 192/4 A |
| 3,299,999 | 1/1967 | Martin | 192/4 A |

*Primary Examiner*—Benjamin W. Wyche
*Attorney*—Leonard Phillips et al.

[57] ABSTRACT

A transmission shift lock and parking brake arrangement which is characterized by a single operating lever for effecting locking of the transmission shift lever in neutral position as well as locking of the brakes in engaged position.

6 Claims, 3 Drawing Figures

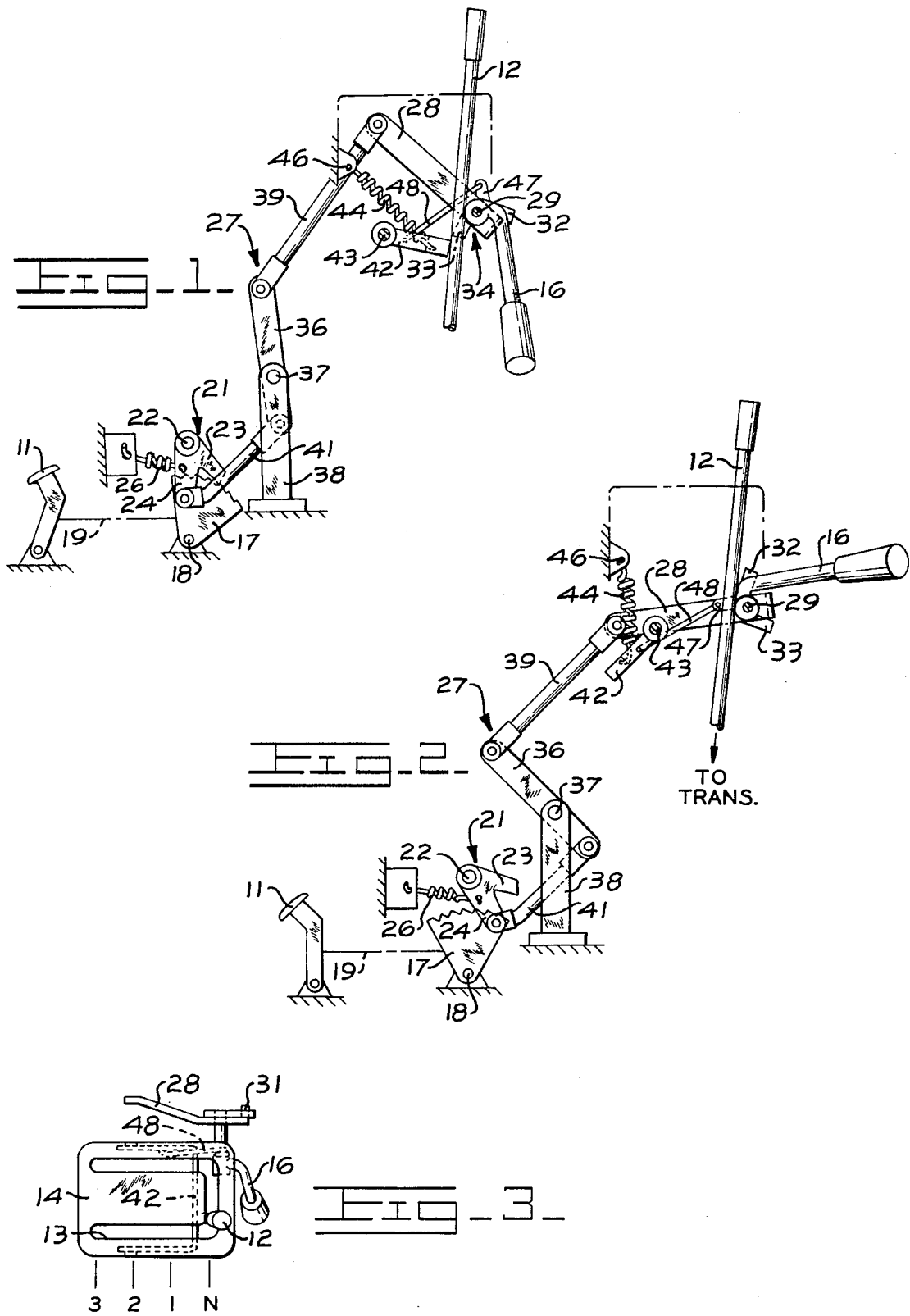

BRAKE AND TRANSMISSION SHIFT LOCKS WITH SINGLE CONTROL LEVER

BACKGROUND OF THE INVENTION

Existing parking brake and shift lock arrangements typically work individually and require that two handles be operated independently as well as the brake pedals in order to lock the transmission shift lever in neutral position and the brakes in a set or engaged position.

The positioning and operation of these handles, moreover, have been such as to discourage the operator from using them when the tractor is stopped and parked. In addition, with existing arrangements it is usually possible to release the brakes by merely applying pressure to the pedals that have been retained in the applied position by the parking lock.

SUMMARY OF THE INVENTION

The present invention relates to an improved transmission shift lock and parking brake arrangement for track-type tractors, and is more particularly directed to such an arrangement wherein a single operating lever is employed to engage both the transmission lock and brake.

It is an object of the present invention to provide a single operating lever transmission shift lock and brake control which is more convenient in its position and operation than previous lock arrangements such that an operator is more inclined to use the control prior to leaving the tractor.

Another object of the invention is the provision of a single operating lever transmission shift lock and brake arrangement having means for locking the operating lever in the "on" position.

It is a further object of the invention to provide an arrangement of the class described which is so arranged that the brake pedals cannot be released and only applied with more force until such time as the control has been unlocked and moved to the "off" or normal machine operating position.

A still further object of the invention is to provide an arrangement of the class described having a lock for holding the transmission shift lever in the neutral position, which lock is held by an overcenter spring thereby requiring a definite and positive force be applied to the operating lever to release locking control.

In the accomplishment of the foregoing and other objects and advantages, a transmission shift lock and parking brake arrangement in accordance with the present invention generally comprises an operating lever, a pivotal ratchet associated with a brake pedal of the tractor and which is rotatable responsive to depression of the pedal, a pawl pivotal between a first position displaced from the ratchet and a second position engageable therewith to prevent movement of the pedal in a direction opposed to the depressing direction thereof, a linkage coupling the lever to the pawl to effect pivotal movement between the first and second positions thereof responsive to movement of the lever between an "off" or normal machine operate position and an "on" position, a pivotal stop member and an associated overcenter spring for holding the stop member in first and second overcenter positions, the first position being displaced from the transmission shift lever of the tractor and the second position being engageable with the shift lever in its neutral position with pivotal movement of the stop member from its first to second position being effective to move the shift lever to neutral position. And link means coupling the operating lever to the stop member to effect pivotal movement of the stop member between its first and second positions responsive to movement of the lever between its "off" and "on" positions.

BRIEF DESCRIPTION OF THE DRAWING

FIG. 1 is a partially schematic side elevational view of a transmission shift lock and parking brake arrangement in accordance with the present invention, the lock being depicted in its "on" position wherein the brakes are locked in their applied position and the transmission shift lever is locked in its neutral position.

FIG. 2 is a view similar to FIG. 1, but depicting the lock in its "off" or normal machine operate position wherein the brakes and transmission shift lever are free for normal operation.

FIG. 3 is a plan view of a transmission shift lever lock member of the arrangement depicted in the "on" position of FIG. 1.

DETAILED DESCRIPTION OF THE PREFERRED EMBODIMENT OF THE INVENTION

Referring now to the drawing in detail, there is shown a brake pedal 11 of a track-type tractor or the like, and the transmission shift lever 12 thereof which is movable in a slot 13 of a shift pattern plate 14 (see FIG. 3) from a neutral (N) position at the right side of the plate, as viewed in the Figure, to first, second, and third, (1, 2 and 3) gear speed positions to the left of neutral position.

It is of course desirable when the tractor is stopped and parked that provision be made to conveniently lock the brakes in an applied position and the shift lever 12 in neutral position in order to prevent unintentional movement of the tractor by a curious child or anyone who might inadvertently release the brakes and/or turn over the engine with the tractor in gear. Heretofore, safety lock mechanisms to the foregoing ends have been relatively cumbersome to manipulate in that separate locks have been provided for the brakes and the transmission shift lever, and the operating levers for such locks have been located in relatively obscure positions wherein the operator of the tractor tends to forget to apply the locks prior to leaving the tractor.

In order to obviate the foregoing difficulties the present invention provides an improved lock arrangement for the brakes and shift lever 12 which features a single operating lever 16 for locking both the brakes and shift lever, which lock operating lever may be readily disposed in a conspicuous location which tends to insure that the operator will apply the locks before leaving the tractor upon stopping and parking same.

More particularly, the inventive lock arrangement preferably includes a ratchet 17 pivotally mounted on the vehicle as indicated at 18 and coupled to the brake pedal 11, as indicated by phantom line 19. Thus, when the brake pedal is applied or depressed the ratchet is rotated clockwise as shown in FIG. 1. Conversely the ratchet is rotated counterclockwise, as shown in FIG. 2, when the brake pedal is released.

Associated with the ratchet there is provided a pawl 21 in the form of a bell crank pivotally mounted on the vehicle frame as indicated at 22. The pawl includes a dog arm 23 which is engageable with the teeth of the ratchet, and an angularly related arm 24. A fixed spring 26 is secured to arm 24 to act in a direction normally urging the pawl clockwise to engage the dog 23 with the ratchet teeth. In this regard, it is to be noted that the dog of the pawl normally engages the ratchet teeth in such manner as to permit clockwise rotation thereof and thus depression of brake pedal 11, while preventing counterclockwise rotation of the ratchet and release of the brake pedal. In other words, the pawl normally acts to retain the brake pedal in applied or depressed position, as shown in FIG. 1. Although the brake pedal may be further applied, its release is prevented by the pawl.

Release of the brake pedal only occurs when the pawl is rotated counterclockwise against the loading of spring 26 to an unobstructing position wherein the dog is disengaged from the ratchet teeth, as shown in FIG. 2. In such unobstructing position of the pawl, the brake pedal may of course be freely applied or released.

The lock operating lever 16 is coupled to the pawl 21 by means of a brake lock linkage 27 which is arranged to rotate the pawl clockwise into engaged position with ratchet 17 responsive to the operating lever being in an "on" position, as indicated in FIG. 1, and rotate the pawl counterclockwise into unobstructing position with respect to the ratchet responsive to the operating lever being in an "off" or normal machine operate position, as indicated in FIG. 2.

Linkage 27 preferably includes a lever 28 mounted at a point spaced from one end for pivotal movement about the pivot shaft 29 of operating lever 16, which shaft is rotatable, but fixed in axial position. Such first end of lever 28 is provided with a right-angularly turned stop lip 31 which is engageable by substantially right-angularly related arms 32 and 33 of a bell crank 34 fixedly secured to shaft 29 for rotation therewith.

More particularly, when lever 16 is rotated clockwise, arm 32 engages stop lip 31 to in turn pivot lever 28 clockwise upon continued clockwise rotation by lever 16. Conversely, when lever 16 is rotated counterclockwise, arm 33 engages stop lip 31 to pivot lever 28 counterclockwise upon continued clockwise rotation of lever 16.

Linkage 27 also includes a lever 36 pivotally mounted at an intermediate position 37 to a fixed standard assembly 38. A rod 39 is pivotally connected at its opposite ends to respectively the opposite end of lever 28 from that provided with lip 31, and one end of lever 36. A rod 41 is likewise pivotally connected at its opposite ends to the second end of lever 36 and to arm 24 of pawl 21.

Thus, assume operating lever 16 is in its clockwise oriented "on" position with crank arm 32 engaging lip 31 of lever 28 and pawl 21 engaging ratchet 17 under the loading of spring 26, as indicated in FIG. 1. Now, if operating lever 16 is rotated counterclockwise, crank arm 33 engages lip 31 to rotate lever 28 counterclockwise about pivot shaft 29. Such action causes rod 39 to move downwardly and clockwise, which in turn imparts counterclockwise rotation to lever 36, thereby causing rod 41 to urge pawl 21 counterclockwise about pivot 22 against the loading of spring 26. In such counterclockwise oriented "off" position of lever 16, it is to be noted that the corresponding counterclockwise oriented position of pawl 21 is productive of dog 23 being disengaged from ratchet 17 and unobstructing to free pivotal movement of the ratchet responsive to depression and release of the brake pedal 11.

Conversely, when the lever 16 is rotated clockwise to the "on" position of FIG. 1, the elements of linkage 27 are pivoted in directions opposite to that just described to force the dog 23 of pawl 21 to engage the teeth of ratchet 17 under the loading of spring 26.

Considering now the means for locking the transmission shift lever 12 in neutral position, same will be seen to include a U-shaped stop member 42 having the ends of its parallel side legs mounted for rotation about a fixed pivot axis 43. An overcenter spring 44 is secured between a fixed anchor point 46 and one side leg of stop member 42 at a position substantially displaced from pivot axis 43.

Due to the overcenter spring 44, stop member 42 has two stable spring loaded positions. In the first position, as shown in FIG. 1, the web of the stop member 42 engages the transmission shift lever 12 in its rightwardly disposed neutral position to retain the shift lever therein. When the stop member is pivoted clockwise beyond the overcenter position of spring 44, such member is spring loaded to its second stable position, as shown in FIG. 2, which is unobstructing to leftward movement of the shift lever from its neutral position to any of the gear range positions. Upon counterclockwise pivotal movement of the stop member from its second to first spring loaded position, the web of the stop member engages the shift lever 12 to forcefully urge same to its neutral position.

In order that movement of stop member 42 between its two stable positions be effected upon movement of operating lever 16 between its "on" and "off" position, a transmission shift lock linkage is provided which includes an arm 47 projecting from operating lever pivot shaft 29 at a position angularly intermediate crank arm 32 and 33, and a link 48 having its opposite ends respectively pivotally connected to arm 47 and a side leg of the stop member at a point intermediate the pivot axis 43 thereof and the position of connection of overcenter spring 44 thereto.

It will be thus appreciated that when operating lever 16 is pivoted clockwise towards its "on" position, link 48 effects counterclockwise movement of stop member 42 to its first stable position wherein it engages the transmission shift lever 12 to move same to and retain same in neutral position. When the operating lever is pivoted counterclockwise towards its "off" position, link 48 effects clockwise movement of the stop member to its second stable position of unobstruction to movement of the transmission shift lever.

As an important feature of the lock arrangement of the present invention, it is to be noted that overcenter spring 44 also serves to lock the operating lever 16 in both of its "on" and "off" positions, as well as the brake lock linkage 27 in either of its positions corresponding to such "on" and "off" positions.

In the overall operation of the transmission shift lock and parking brake arrangement physically described hereinbefore, the operating lever 16 may be placed in its "off" position, as shown in FIG. 2, whereby the pawl 21 is unobstructing to the brake ratchet 17 associated with brake pedal 11 and stop member 42 is unobstructing to transmission shift lever 12. Overcenter spring 44 holds the lever 16 and its associated brake and transmission shift lever locking linkages in such position. However, when operating lever 16 is pivoted clockwise to its "on" position, as shown in FIG. 1, brake locking linkage 27 effects pivoting of pawl 21 into position wherein dog 23 thereof engages the teeth of ratchet 17 upon depression of brake pedal 11, thereby locking the brakes. Simultaneously, stop member 42 urges shift lever 12 to its neutral position and retains same therein. Again, overcenter spring 44 holds lever 16 and its associated linkages in such "on" position.

The single operating lever 16 is preferably located on the left side of the tractor such that when the lever is in the "off" position it protrudes into the operator's way when he climbs off the tractor. In this manner, the operator is reminded that the lever should be repositioned "on" when he climbs off the tractor.

Although the present invention has been hereinbefore described and illustrated in the accompanying drawing with respect to a single preferred embodiment, it will be appreciated that numerous variations and changes may be made therein without departing from the true spirit and scope of the invention, and thus it is not intended to limit the invention except by the terms of the appended claims.

What is claimed is:

1. A transmission shift lock and parking brake arrangement for a vehicle including a brake pedal depressible to a brake actuated position and a transmission shift lever movable in a predetermined direction from a neutral position to at least one gear speed position, said arrangement comprising a pivotal ratchet coupled to said brake pedal, said ratchet being rotatable in a first direction responsive to depression of said pedal and rotatable in a second opposite direction responsive to release of said pedal, a pawl pivotal between a first position disengaged from said ratchet and a second position engageable therewith to prevent movement thereof in said second direction, means normally spring loading said pawl to said second position, an operating lever pivotal between an "off" position and an "on" position, a linkage coupling said operating lever to said pawl for effecting pivotal movement thereof between said first and second positions responsive to pivotal movement of said operating lever between said "off" and "on" positions, a pivotal stop member movable between a first position unobstructing to movement of said shift lever and a second position obstructing movement of said shift lever from said neutral position in said predetermined direction, and a second linkage coupling said operating lever to said stop member for effecting pivotal movement of the latter between said first and second positions thereof responsive to pivotal movement of the former between said "off" and "on" positions thereof.

2. The combination of claim 1, further defined by said stop member having an associated overcenter spring for resiliently retaining said stop member in both of said first and second positions thereof, whereby said overcenter spring retains said operating lever in both of its "off" and "on" positions.

3. The combination of claim 1, further defined by said operating lever having a pivot shaft with a bell crank secured thereto for rotation therewith, said crank having first and second substantially right-angularly related arms, said first linkage comprising a first lever pivotally mounted at a point spaced from a first end thereof for rotation about said pivot shaft, said lever having a right-angularly turned lip at said first end thereof engageable by said first arm of said crank upon rotation of said operating lever in a first direction towards said "off" position and engageable by said second arm of said crank upon rotation of said operating lever in a second opposite direction towards said "on" position, a second lever pivotally mounted at an intermediate position thereof, a rod coupling a second end of said first lever opposite said first end thereof to a first end of said second lever to effect rotation thereof responsive to rotation of said operating lever and in the same rotational direction thereas, and a second rod coupled to the opposite second end of said second lever, said pawl having a first arm defining a dog engageable with said ratchet and a second arm angularly related to said first arm of said pawl, said second rod coupled to said second arm of said pawl to effect rotation thereof in response to and in the same rotational direction as said second lever, said pawl being pivoted in said first rotational direction towards said first position thereof and in said second rotational direction towards said second position thereof.

4. The combination of claim 3, further defined by said stop member having an associated overcenter spring for resiliently retaining said stop member in both of said first and second positions thereof, whereby said overcenter spring retains said operating lever in both of its "off" and "on" positions.

5. The combination of claim 4, further defined by said stop member being of U-shaped configuration having the ends of its parallel side legs mounted for rotation about a fixed pivot axis, said overcenter spring being secured between a fixed anchor point and one side leg of said stop member at a position displaced from said pivot axis thereof, said stop member being pivotal in said second rotational direction towards said first position thereof and pivotal in said first rotational direction towards said second position thereof, said second linkage comprising a third arm secured to said pivot shaft of said operating lever at a position angularly intermediate said first and second crank arms for rotation therewith, and a link coupled between said third arm and a side leg of said stop member at a point intermediate said pivot axis thereof and the position of connection of said overcenter spring thereto to urge said stop member in said second rotational direction responsive to pivotal movement of said operating lever in said first rotational direction and urge said stop member in said first rotational direction responsive to pivotal movement of said operating lever in said second rotational direction.

6. The combination of claim 2, further defined by said stop member being of U-shaped configuration having the ends of its parallel side legs mounted for rotation about a fixed pivot axis, said overcenter spring being secured between a fixed anchor point and one side leg of said stop member at a position displaced from said pivot axis thereof, said second linkage comprising a link coupled between said operating lever and a point of a side leg of said stop member intermediate said pivot axis thereof and the position of connection of said overcenter spring thereto.

* * * * *